(No Model.) 5 Sheets—Sheet 1.
N. RAEZ.
PLANTING AND SEEDING MACHINE.
No. 494,795. Patented Apr. 4, 1893.
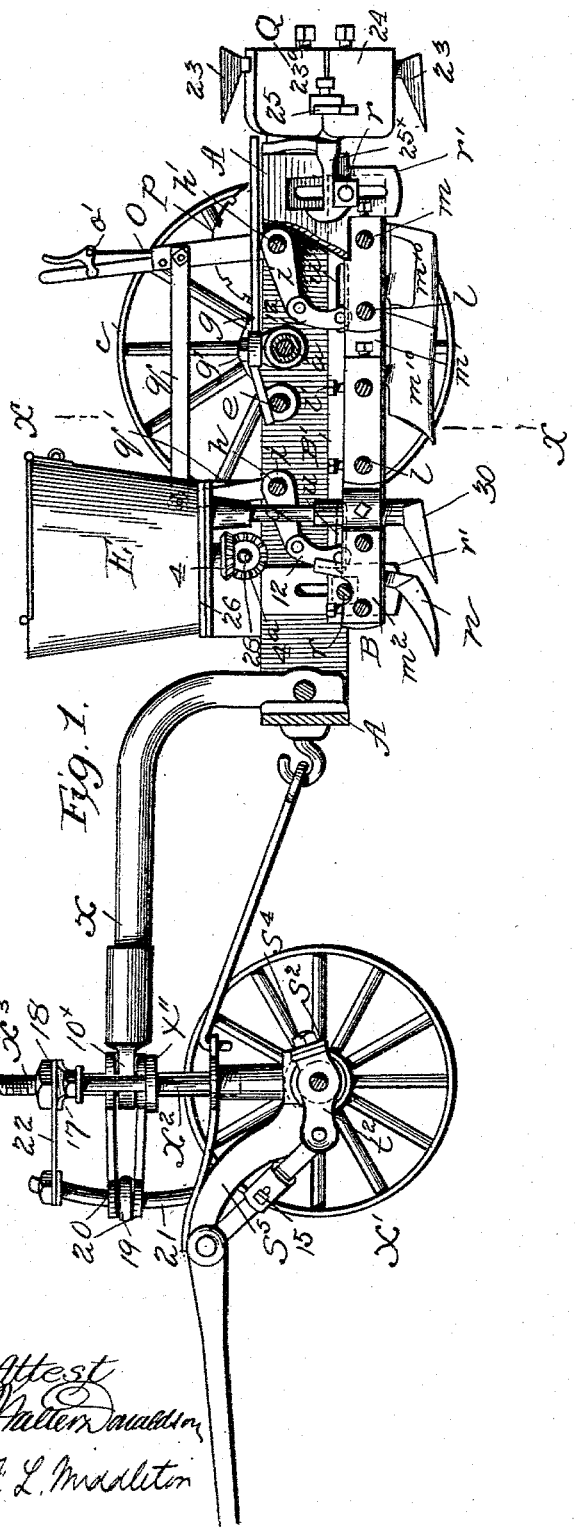
Attest
Walter Daulden
F. L. Middleton
Inventor
N. Raez
by Richards & Co.
Attys

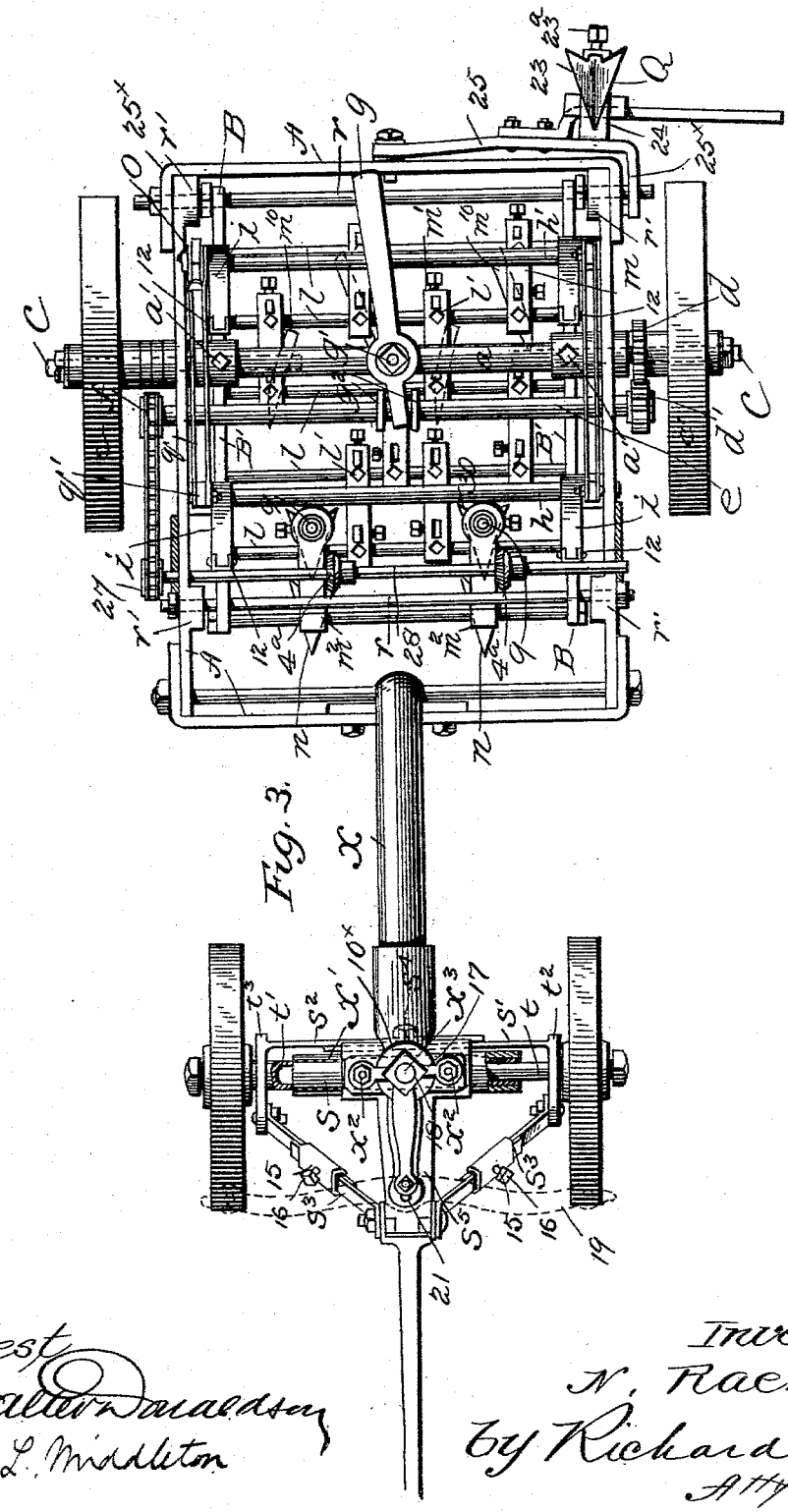

(No Model.) 5 Sheets—Sheet 3.
N. RAEZ.
PLANTING AND SEEDING MACHINE.
No. 494,795. Patented Apr. 4, 1893.
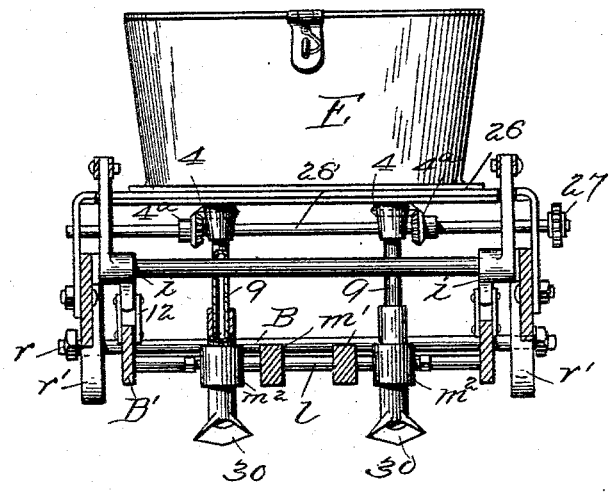
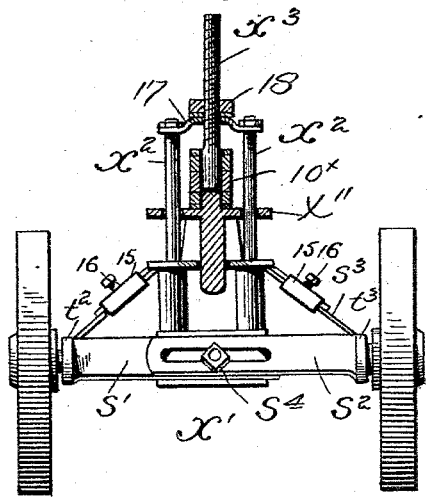
Attest
Walter Donaldson
F. L. Middleton
Inventor
N. Raez
by Richards & Co.
Attys (No Model.) 5 Sheets—Sheet 4.
N. RAEZ.
PLANTING AND SEEDING MACHINE.
No. 494,795. Patented Apr. 4, 1893.
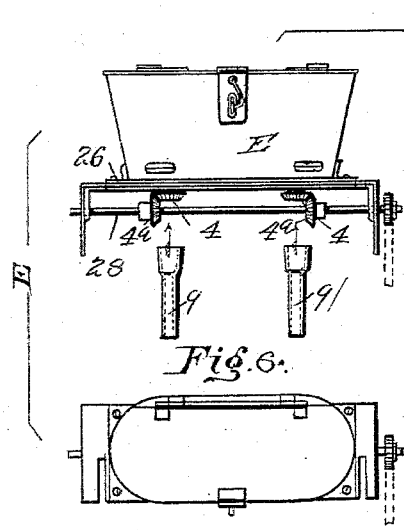
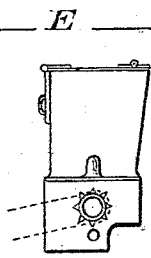
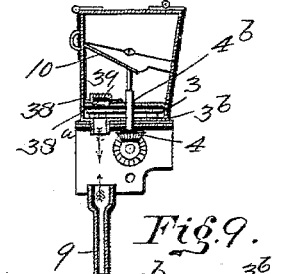
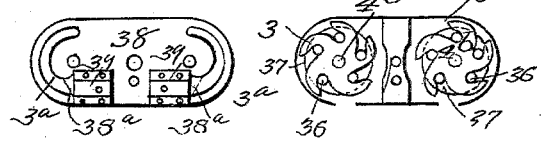
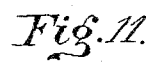
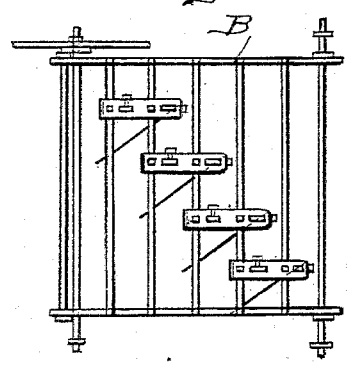
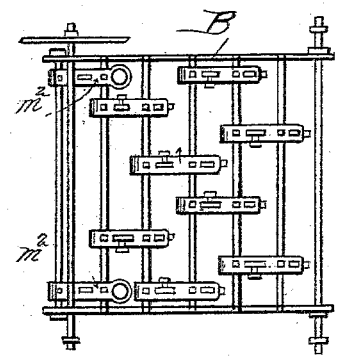
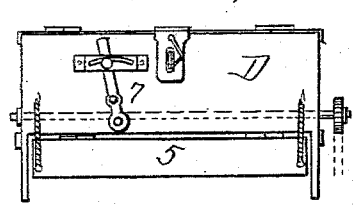
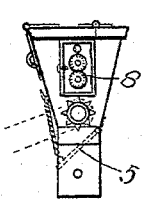
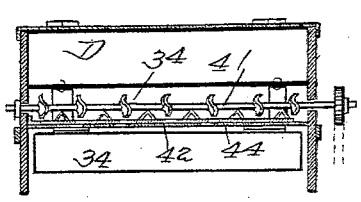
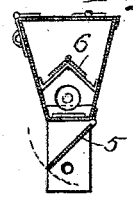
Witnesses:
Ferd. H. Mayers,
E. T. Evans
Inventor:
Nikolaus Raez
per P. V. Wise and
Herman Bruning
Attorneys.

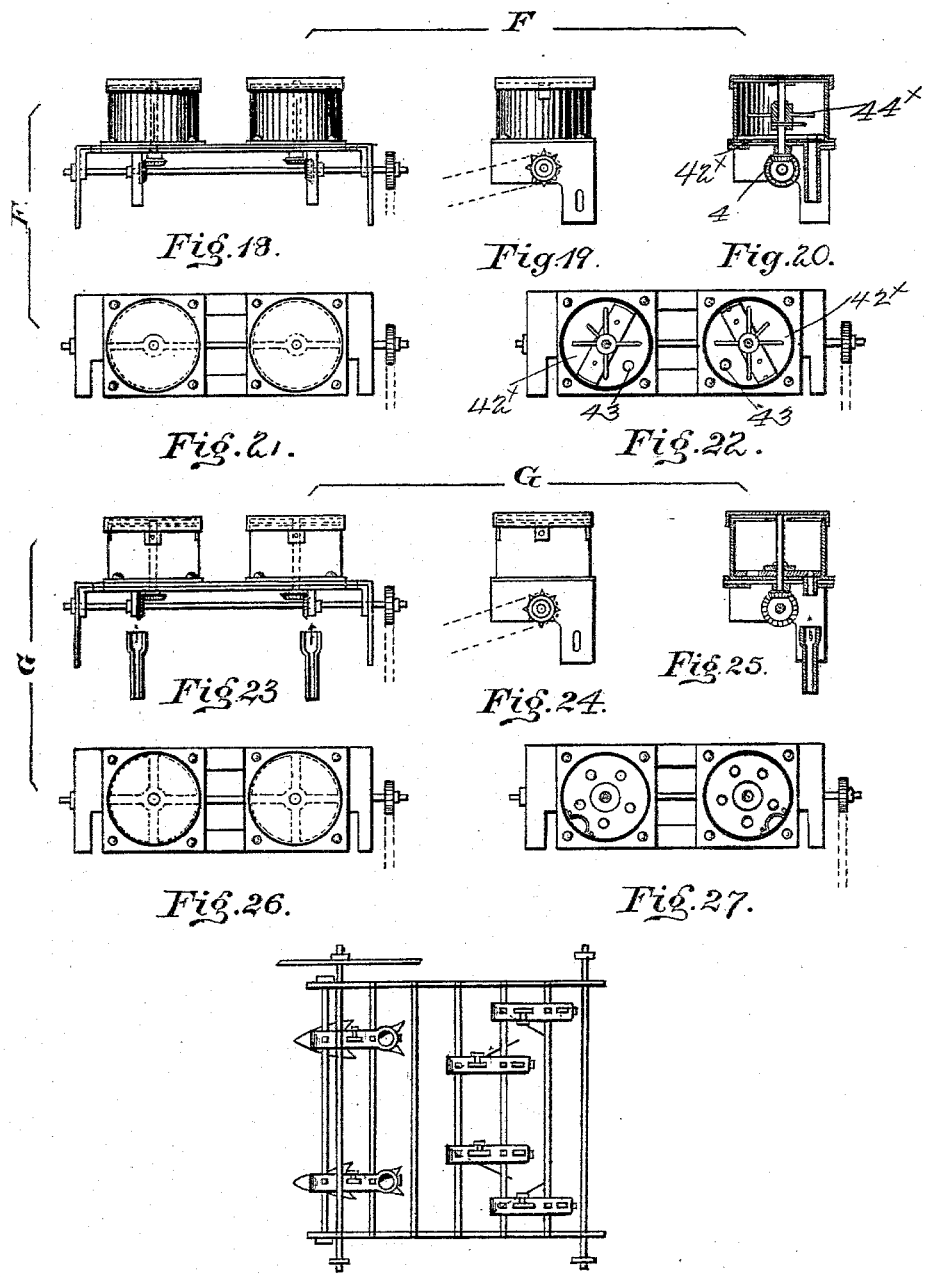

UNITED STATES PATENT OFFICE.

NIKOLAUS RAEZ, OF ST. JOSEPH, MISSOURI.

PLANTING AND SEEDING MACHINE.

SPECIFICATION forming part of Letters Patent No. 494,795, dated April 4, 1893.

Application filed February 10, 1892. Serial No. 421,068. (No model.)

*To all whom it may concern:*

Be it known that I, NIKOLAUS RAEZ, (a natural-born native and citizen of Switzerland, having filed his declaration to become a citizen of the United States,) residing at St. Joseph, in the county of Buchanan and State of Missouri, have invented certain new and useful Improvements in Agricultural Planting and Seeding Implements or Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is especially designed to meet the requirements of small farmers who have limited means and on this account are unable to provide an independent machine for each class of work in planting and cultivating.

The main object is to provide a machine capable of carrying out several different kinds of work when properly adjusted, and I aim to carry out the invention without complicating the implement or rendering it clumsy or difficult to handle.

My invention is shown in the accompanying drawings, in which—

Figure 1 is a side view of the machine with parts broken away and parts in section. Fig. 2 is a rear view with parts omitted. Fig. 3 is a plan view with parts removed and parts in section. Fig. 4 is a transverse sectional view on line $x$—$x$ Fig. 1. Fig. 5 is a rear view of the truck with parts in section. Figs. 6, 7, 8 and 9 are views of the seed box. Figs. 10 and 11 are views of the disk contained in said box and the partition plate. Figs. 12 and 13 are views showing the various adjustments of the tools on the supplemental frame. Fig. 14 is a rear elevation of another form of seed box. Fig. 15 is an end view: Fig. 16 a longitudinal section and Fig. 17 a transverse section of the same. Fig. 18 is a rear elevation of the feed boxes for manure. Fig. 19 is an end view; Fig. 20 a transverse section; Fig. 21 a plan view and Fig. 22 a plan view of the inside of said feed box, the cover being removed. Figs. 23, 24, 25, 26, and 27 are similar views of the boxes for corn and the like. Fig. 28 is a plan of the supplemental frame with the furrow openers and coverers set for corn planting.

The main frame A composed of metal bars has a tubular reach $a$ extending between its sides in which are secured adjustably by the set screws $a'$, the spindles C upon which are journaled the carrying wheels $c$, $c'$.

The supplemental frame B for carrying the implements to work in the soil is composed of side bars $B'$ connected by a series of parallel rods $l$ to which are secured adjustably by the set screws $l'$, the blocks $m$, $m'$, $m^2$ &c. These blocks having vertical perforations to receive the shanks of the tools $m^{10}$, each block is supported by two of the rods $l$ and the arrangement is such that the blocks with the the tools may be set in any desired position relatively to each other to suit the kind of work desired.

The side bars of the supplemental frame are slotted at $u$, to receive the bolts or links 12 which are pivoted to the arms $i$ secured on rock shafts $h$, $h'$ extending respectively across and journaled in the main frame in front and in rear of the tubular reach $a$. The rear rock shaft $h'$ is operated by a lever O having a latch lever $o'$ by which the lever is engaged with and disengaged from the notched segment $p$ on the main frame. By turning the lever the rear rock shaft is moved and this movement is communicated to the front rock shaft by the links $q$ and the arms $q'$. The rocking movement of the shafts raises or depresses the arms secured therein and through the links this movement raises or lowers the supplemental frame, to regulate the depth of penetration or to raise the tools entirely from the ground.

The main frame has depending guide ways $r'$ which receive the cross rods $r$ of the supplemental frame, said rods projecting from the sides thereof into the said guide ways.

The supplemental frame is adapted in size to move within the limits of the main frame and the connections described between the frames are arranged within the main frame. In order to sustain the frame properly, and to permit the proper guiding of the machine, I employ a front truck consisting of a hollow cross bar S in which the spindles $t$, $t'$ are adjustably held, the spindle marked $t'$ being larger and formed hollow to receive the spindle on the other side whereby a long bearing for both spindles is afforded and a wide range of adjustment secured. The truck wheels are held to the spindles $t$, $t'$, by nuts on their screw threaded ends. Collars $t^2$, $t^3$ are secured to the spindles just inside the bearing points of the wheels and to these collars the slotted bars $S'$, $S^2$ are secured which bear on the hollow cross bar and are adjustably secured thereto by the screw $S^4$. Adjustable bars $S^3$ extend from the collars in front of the truck to the forward end of the bracket $S^5$ on the truck, the arrangement being such that the bars $S'$, $S^2$ and $S^3$ are adjusted with the spindles to suit the work being done and thus serve to support the outer ends of the spindles. The bars $S^3$ have a slip joint at 15 which is held rigid by a set screw 16.

The truck $X'$ is connected to the main frame by a curved neck $X$ having an eye $10^x$ at its front end to receive the screw rod $X^3$ which is connected with a saddle $X''$ movable vertically on upright rods $X^2$ secured to the hollow cross bar of the truck; the rods $X^2$ are connected at their upper ends by the bar 17 upon which the nut 18 finds a bearing. The turning of this nut raises or lowers the saddle $X''$ and as the front end of the neck rests upon this saddle the said neck will be moved correspondingly and thus the frame of the machine properly adjusted. The single tree 19 is pivoted in the front ends of the links 20 which are held by the screw rod on each side of the forward end of the neck X. The pivot rod 21 of said single tree extends up and is connected with the upright frame by the rod 22.

In order to mark the course of the machine across the field, and thus enable the operator to accurately direct the same on the return, I pivot a marker Q on the rear of the cross bar of the main frame. The marker may consist of any suitable form of plow shaped tool 23 adjustably held by set screws $23^a$ in a block 24 carried by an arm 25 pivoted centrally of the frame in either of the openings 40 or 50, so that the marker may be swung to either side or raised out of work entirely. The end of the lever is bent around the corner of the frame at $25^x$ to rest upon the projecting end of the cross rod $r$ of the supplemental frame so that the said marker will be adjusted to and from work with the said frame.

In connection with the above machine I combine permanently mechanism for use in planting and it will be understood that the mechanism referred to is intended to be used either simultaneously with the seeding or planting attachment or independently thereof. The seed box E is secured on a platform 26 Fig. 1 extending across the main frame and the valve disks hereinafter described are operated by the beveled pinions 4 on their spindles meshing with the pinions $4^a$ on the transverse shaft 28 journaled in the platform and having a sprocket wheel 27 on its end which engages a chain extending from a similar sprocket wheel $f$ on the end of a shaft $e$ journaled in the main frame and having at its opposite end a pinion $d'$ meshing with a pinion on the hub of the carrying wheel as shown; the shaft $e$ is capable of longitudinal shifting movement to disengage the pinions $d'$ $d$ and stop the seeding operation and this is done by a lever $g$ pivoted at $g'$ to the hollow reach of the frame its forward end fitting between the collars $g^2$ on the shaft $e$. The dropping tubes 9 extend into and if desired through the hollow shanks of the shoes or furrow openers 30 which shanks in turn are held in the openings at the rear ends of the blocks $m^2$ which blocks carry, at their forward ends, the shovels $n$, the arrangement being such that in the upward and downward movement of the supplemental frame the shoes 30 with their shanks will slide up and down on the dropping tubes without in any way interfering with the adjustment of the frame. The seed may be thus deposited at any desired depth by raising and lowering the supplemental frame and the covering implements in rear of the shoes will act to properly cover the seed.

The seed box E is especially designed for seed potatoes. The feeding disks are secured to the spindles $4^b$ of the pinions 4 and are formed double, the lower parts $3^b$ having a series of openings 36 and the upper portion of slightly larger diameter having recesses 37 extending from the periphery inwardly to the said openings. The upper ends of the spindles are journaled in the plate 38 which has at each end the semi-circular openings $3^a$ directly over the openings in the disks so that the seed from the box falls through said openings and to the pockets or openings 37 to be carried around to the mouths of the drop tubes. The double thickness of the disk gives sufficient depth to receive the seed of the largest size. In order to prevent choking in case two small sized seeds get into the pockets of which the upper seed projects above the disk, I provide the spring plates or cut-offs $38^a$ arranged in boxes 39 and having inclined ends reaching down onto the disks upon which the projecting seed rises as the disk carries it around. A distributer plate 10 serves to direct the seed to the disks it inclining to each side.

In place of the box E I may use the box D, especially adapted for cereals or grain and having a shaft 41 provided with cam-shaped disks 34 by which the grain is moved or spread over the holes 42 in the bottom of the box through which the seed pass to the spreader board 5 adjustably hinged below the box so that the inclination may be changed. A distributing board 6 Fig. 17 is secured also within the box over the shaft and disks. The openings in the box may be regulated by the valve slide 44 operated by the lever 7 thus adapting the box to feed more or less, larger or smaller grain. The box may be provided with any suitable form of indicating mechanism shown at 8, Fig. 15 which will show the feeding of the grain or seed. The shaft with its disks is operated through the connections above described consisting of the sprocket chain and the shifting shaft e.

For feeding manure I employ the round boxes F, which are secured to the platform and have perforated disks 42× within them secured to the spindles of the pinions 4 and operating below a plate in the box, which plate is provided with a hole 43 for the passage of the manure to the holes in the disk. A stirrer 44× keeps the contents of the box of proper consistency to insure a perfect feed. The manure passes through the opening 43 into the several openings in the disk as they come below it and is carried by the disk around to the opening of the drop tube. The disk is made of sufficient thickness to carry the desired amount of manure at each step. The disk may be provided with depending tubes to secure a larger carrying capacity without materially increasing the weight of the disk.

It will be understood that the machine may be used for a gang plow by properly adjusting the tools and using the kind of tools suitable for the purpose and in such use the driving mechanism connected with the seed box is thrown out of gear or by changing the tools a cultivator is provided and by a further change a seeder, in the latter case the seeder mechanism being thrown into gear and operating in conjunction with the tools carried by the vertically movable frame.

The various adjustments of the tools on the supplemental frame to suit the different kinds of work will be readily understood by those skilled in the art and need not be particularly referred to. The wheels may be adjusted laterally as desired so that those on one side run in the furrow last made.

What I claim is—

1. In combination the main frame and carrier wheels, the front and rear rock shafts, the supplemental tool frame, the guide ways on the main frame to control the vertical movement of the supplemental frame the said supplemental frame having slotted side bars, the means for operating the rock shafts and the arms and pivoted links extending from said rock shafts, said links engaging the slots of the supplemental frame, substantially as described.

2. In combination, the main frame, the supplemental frame carrying the tools, and being of smaller dimensions than the main frame and adapted to fit within the same, the depending slotted guide ways on the main frame receiving the projecting portions of the supplemental frame, and the means for operating the said supplemental frame, substantially as set forth.

3. In combination, the main frame, the supplemental frame comprising the side bars and the parallel cross rods, the adjustable blocks supported on said parallel rods, each block engaging two of said rods, the tools adjustably carried by the said blocks and the means on the main frame for moving the supplemental frame vertically, substantially as set forth.

4. In combination, the main frame, having the reach a, the carrying wheels at the ends thereof the supplemental tool frame with means for raising and lowering it, the seed box, the feed mechanism therein the driving connections thereto comprising a shaft e extending along side the reach a and having the pinion thereon, the carrying wheel having a pinion and the means for shifting the shaft longitudinally to engage or disengage the said pinions, consisting of the lever g pivoted to the reach and connected at its forward end with the shaft e, substantially as set forth.

5. In combination the main frame, the vertically movable supplemental frame B guided on the main supplemental frame, the operating means for the said frame B, the seed box and the drop tubes, the tool blocks having vertical openings, the tubular tools seated thereon and engaging the drop tubes, the said tool blocks having horizontal openings and the said supplemental frame B having cross bars passing through said horizontal openings, substantially as described.

6. In combination the main frame, the supplemental tool frame with means for moving it vertically, the marker movably secured to the main frame and in connection with the supplemental frame to move therewith, substantially as set forth.

7. In combination the main frame, the tools and the marker, the pivoted lever carrying the same and connected to the central part of the rear of said frame, substantially as set forth.

8. In combination the main frame, the vertically movable supplemental frame B with operating means therefor, the marker, the lever carrying the same pivoted to the main frame and having a bent end and the projection on the frame B to engage said end, said projection passing through guides in the main frame, substantially as set forth.

9. In combination, the main frame, the supplemental frame B carried thereby and vertically adjustable, the means for adjusting said frame, and the means for adjustably supporting the main frame including the front truck, the reach X connecting said truck and main frame, the vertical guides on the truck, the vertically movable saddle and the screw rod and nut for adjusting the saddle, substantially as set forth.

10. In combination, the main frame, the supplemental frame B with means for moving it vertically, and the means for supporting and adjusting the front of the main frame consisting of the front truck the reach X connecting said truck and frame and the means for adjusting the forward end of the said reach, substantially as set forth.

11. In combination the main frame, the supplemental frame carrying adjustable tools the truck frame comprising the hollow cross piece, the spindles adjustable therein, the truck wheels on the said spindles and the adjustable bars connecting said spindles with the frame, whereby the said truck can be adjusted to suit the lateral adjustment of the tools substantially as set forth.

12. In combination the main frame, the supplemental frame carrying adjustable tools, the truck frame, including the hollow cross piece, the hollow spindle carrying one wheel, the spindle carrying the other wheel and adapted to fit within the hollow spindle and the truck wheels on the spindles, whereby the said truck can be adjusted to suit the lateral adjustment of the tools substantially as set forth.

13. In combination, the main frame, the supplemental frame B carried thereby and having laterally adjustable tools and the truck frame carrying laterally adjustable spindles, the main frame having a hollow reach and the spindle secured adjustably in said reach, substantially as set forth.

In testimony whereof I affix my signature in presence of two witnesses.

NIKOLAUS RAEZ.

Witnesses:
VIRGIL WISE,
E. T. EVANS.